(12) United States Patent
Baier et al.

(10) Patent No.: US 6,723,295 B1
(45) Date of Patent: Apr. 20, 2004

(54) HIGH-TEMPERATURE STABILE CATALYSTS FOR DECOMPOSING $N_2O$

(75) Inventors: Michael Baier, Mannheim (DE); Thomas Fetzer, Speyer (DE); Otto Hofstadt, Altrip (DE); Michael Hesse, Worms (DE); Gert Bürger, Mannheim (DE); Klaus Harth, Altleiningen (DE); Volker Schumacher, Frankenthal (DE); Hermann Wistuba, Mannheim (DE); Bernhard Otto, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/807,220

(22) PCT Filed: Oct. 18, 1999

(86) PCT No.: PCT/EP99/07889

§ 371 (c)(1),
(2), (4) Date: Apr. 11, 2001

(87) PCT Pub. No.: WO00/23176

PCT Pub. Date: Apr. 27, 2000

(30) Foreign Application Priority Data

Oct. 21, 1998 (DE) ........................................ 198 48 595

(51) Int. Cl.$^7$ ............................................... C01B 21/22
(52) U.S. Cl. ..................... 423/239.1; 502/340; 502/341
(58) Field of Search ................. 502/303, 342, 502/346, 351, 524, 525, 344, 345; 423/239.1

(56) References Cited

U.S. PATENT DOCUMENTS

| | | | | |
|---|---|---|---|---|
| 5,019,547 A | * | 5/1991 | Chaumette et al. | 502/342 |
| 5,587,135 A | * | 12/1996 | Fetzer et al. | 423/239.1 |
| 5,736,114 A | * | 4/1998 | Barthe et al. | 423/213.2 |
| 5,750,460 A | | 5/1998 | Hartweg et al. | 502/342 |
| 5,905,056 A | | 5/1999 | Hartweg et al. | 502/524 |
| 5,945,080 A | | 8/1999 | Hartweg et al. | 423/239 |
| 5,965,099 A | | 10/1999 | Hartweg et al. | 423/213 |
| 6,027,703 A | | 2/2000 | Hartweg et al. | 423/213 |
| 6,030,589 A | | 2/2000 | Hartweg et al. | 423/313 |
| 6,124,234 A | * | 9/2000 | Fetzer et al. | 502/324 |
| 6,153,161 A | * | 11/2000 | Fetzer et al. | 423/213.2 |
| 6,153,162 A | | 11/2000 | Fetzer et al. | 423/239 |
| 6,177,382 B1 | * | 1/2001 | Hesse et al. | 502/303 |

FOREIGN PATENT DOCUMENTS

| | | | |
|---|---|---|---|
| DE | 42 24 881 | | 2/1994 |
| DE | 4301470 A | * | 7/1994 |
| DE | 196 53 200 | | 6/1998 |
| EP | 00210681 A1 | * | 12/1981 |
| EP | 00042471 A1 | * | 2/1987 |
| EP | 0 687 499 | | 12/1995 |
| EP | 0 779 093 | | 6/1997 |
| EP | 0 779 094 | | 6/1997 |
| EP | 0 779 095 | | 6/1997 |
| WO | WO 94/16798 | | 8/1994 |
| WO | WO 97/21482 | * | 6/1997 |

OTHER PUBLICATIONS

Thiemens et al. "Nylon Production: An Unknown Source of Atmospheric Nitrous Oxide" Science vol. 251 (1991) pp. 932–934, no month.

* cited by examiner

Primary Examiner—Stuart L. Hendrickson
Assistant Examiner—Peter J Lish
(74) Attorney, Agent, or Firm—Keil & Weinkauf

(57) ABSTRACT

A copper-containing catalyst of the composition of $N_2O$ contains a compound of the formula $M_xAl_2O_4$, where M is Cu or a mixture of Cu and Zn and/or Mg and x is from 0.8 to 1.5. The novel catalyst is used in a process for the catalytic decomposition of pure $N_2O$ or $N_2O$ contained in gas mixtures, at elevated temperatures.

6 Claims, No Drawings

HIGH-TEMPERATURE STABILE CATALYSTS FOR DECOMPOSING N$_2$O

The present invention relates to a catalyst for the decomposition of N$_2$O, a process for its preparation and a process for the decomposition of N$_2$O using this catalyst.

N$_2$O forms as a byproduct in many processes in which HNO$_3$ is used in the liquid phase as an oxidizing agent. Particularly in the conversion of alcohols, aldehydes and ketones, e.g. cyclohexanol and cyclohexanone, to adipic acid, acetaldehyde to glyoxal or glyoxal to glyoxylic acid, considerable amounts of N$_2$O are liberated. Furthermore, N$_2$O is emitted in the preparation of nicotinic acid and hydroxylamine. N$_2$O also forms the byproduct in the preparation of nitric acid by combustion of NH$_3$.

In an article published in 1991 in Science, 251 (1991), 932, Thiemens and Trogler show that N$_2$O potentially harms the earth's atmosphere to a certain degree. In the stratosphere, N$_2$O is considered to be an important source of NO, which in turn is said to have a substantial effect on the degradation of ozone in the stratosphere. In addition, N$_2$O is considered a greenhouse gas, and the potential of N$_2$O for heating up the earth is 290 times greater than that of CO$_2$.

Recent years have seen a large number of publications which are concerned with reducing the N$_2$O emissions caused by anthropogenic activities.

The use of catalysts in the reduction or decomposition of N$_2$O makes it possible to carry out the reaction at a temperature level substantially lower in comparison with the purely thermal decomposition.

EP-A 0 687 499 describes a catalyst for catalytic reduction of NO$_x$ and/or for oxidation of hydrocarbons in off-gases, which consists of a copper oxide-zinc oxide-aluminum oxide spinel of the chemical formula Cu$_A$Zn$_c$Al$_D$O4, where A+C +D=3, A>0, C>0 and D>0. In this publication, the ratio of Cu and Zn to Al can be freely chosen within wide limits. In an example, NO is reacted with propene of the disclosed catalysts to give N$_2$ and H$_2$O. The decomposition of N$_2$O at high temperatures is not discussed.

WO 94/16798 describes a process for the catalytic decomposition of pure N$_2$O or N$_2$O contained in gas mixtures. The catalyst used is an M$_x$Al$_2$O$_4$ catalyst. This is prepared by mixing CuAl$_2$O$_4$ with Sn, Pb or an element of the 2nd main group or subgroup of the Periodic Table of the Elements as an oxide or salt or in elemental form and then calcining at from 300° C. to 1300° C. and from 0.1 to 200 bar. According to Comparative Examples 1 and 2, as presented further below in the present description at the beginning of "Examples", the x value in the formula M$_x$Al$_2$O$_4$ is 0.61 (Comparative Example 1) and 0.76 (Comparative Example 2).

The catalyst systems known from the prior art are suitable for the decomposition of N$_2$O. Their thermal stability at above 500° C. is, however, not optimum. One problem which still exists in many cases is the deactivation of the catalysts, necessitating frequent replacement of the catalyst bed Particularly at above 500° C., as is advantageous for virtually complete degradation of the N$_2$O with an acceptable amount of catalyst, pronounced, irreversible deactivation occurs.

It is an object of the present invention to provide a catalyst for the decomposition of N$_2$O, which catalyst is thermally stable at high temperatures.

We have found this object is achieved by a copper-containing catalyst for the decomposition of N$_2$O, containing a compound of the formula M$_x$Al$_2$O$_4$, where M is Cu or a mixture of Cu with Zn and/or Mg. According to the invention, x is typically from 0.8 to 1.5 in the catalyst.

The novel catalysts are preferably essentially spinels which may still contain small amounts of free oxides in crystalline form, such as MO (where M is, for example, Cu, Zn or Mg) and M$_2$O$_3$ (where M is, for example, Al). The presence of a spinel phase can be detected by recording XRD spectra. The amount of the oxides in the catalyst is in general from 0 to 5, preferably from 0 to 3.5, % by weight.

The amount of Cu and any Zn and/or Mg should be chosen such that a filled or virtually filled spinel is obtained. This means x in the formula M$_x$Al$_2$O$_4$ is from 0.8 to 1.5, preferably from 0.9 to 1.2, particularly preferably from 0.95 to 1.1. We have found that, for x values below 0.8, the thermal stability is substantially lost. x values above 1.5 likewise lead to a deterioration in the catalyst activity and catalyst stability. The novel catalyst having an x value of from 0.8 to 1.5, preferably from 0.9 to 1.2, particularly preferably from 0.95 to 1.1, in the formula M$_x$Al$_2$O$_4$ is thus a high temperature-stable catalyst for decomposition of N$_2$O. The catalyst has advantageous aging behavior, i.e. the catalyst remains active for a long time without being thermally deactivated.

The novel catalysts contain copper in oxide form, calculated as a copper oxide, CuO, in an amount of in general from 1 to 54, preferably from 5 to 40, particularly preferably from 10 to 30, % by weight, based on the total catalyst.

The novel catalyst may additionally contain further dopants, in particular Zr and/or La, in oxide form. Doping with Zr and/or La further increases thermal stability of the catalysts, but the initial activity is slightly reduced. It is particularly advantageous to introduce Zr and/or La dopants via corresponding element-doped aluminum oxides. The content of the dopant compounds in the novel catalyst is in general from 0.01 to 5.0, preferably from 0.05 to 2, % by weight.

In addition, the novel catalyst may contain further metallic active components. Such metallic active components are preferably metals of the 8th subgroup of the Periodic Table of the Elements, particularly preferably Pd, Pt, Ru or Rh. As a result, it is possible to obtain catalysts which not only are very active at high temperatures but have a very high activity at temperatures as low as below 400° C. The novel catalysts can therefore be used in a wide temperature range, which is a major advantage in the case of adiabatically operated N$_2$O decomposition processes. The amount of the metals of the 8th subgroup in the novel catalyst is in general from 0.01 to 5, preferably from 0.1 to 2, % by weight.

The novel supported catalysts may be present in the form of pellets, honeycombs, rings, chips or solid or hollow extrudates or in other geometric shapes. For specific applications, it is important that the shape and size are chosen such that a very small pressure loss results.

The novel catalysts generally have a BET surface area of from 30 to 150, preferably from 50 to 100, m$^2$/g.

The novel catalysts preferably have a bimodal or trimodal pore structure. They contain mesopores of from 10 to 100 nm, preferably from 10 to 30 nm, and macropores of from 100 to 5000 nm, preferably from 100 to 2000 nm. Such catalysts are substantially more active than catalysts having a monomodal pore structure.

The porosity of the carrier should advantageously be such that the pore volume is from 0.10 to 0.70 ml/g.

The novel catalysts can be prepared from oxide starting materials or from starting materials which are converted into the oxide form during the final calcination. They can be prepared by a process in which the starting materials, containing Al, Cu and, if required, Zn and/or Mg, and, if required, further additives, are mixed, converted into moldings and, if required, treated at above 500° C. in one step.

In a preferred embodiment of the process a mixture of the starting materials is processed, for example by drying and pelleting, to give corresponding moldings. These are then heated at from 500 to 1000° C. for from 0.1 to 10 hours (calcination). Alternatively, a molding material can be prepared with the addition of water in a kneader or mix-muller and extruded to give corresponding moldings. The moist moldings are dried and then calcined as described.

Particularly preferably, the novel catalysts are prepared by a process which comprises the following steps:

a) preparation of a Cu—Al oxide molding, b) impregnation of the molding with soluble Cu compounds and, if required, Mg compounds and/or Zn compounds, c) subsequent drying and calcination.

In this process, preferably a carrier is first prepared from Cu in the form of $Cu(NO_3)_2$ and/or CuO and an Al component. In the preparation of the carrier, starting materials can be mixed, for example, in dry form or with the addition of water. Zn and/or Mg component(s) can be applied to the carrier by impregnating once or several times. The novel catalysts are obtained by drying and calcination at from 500 to 1000° C., preferably from 600 to 850° C.

Preferably, Cu is used as a mixture of CuO and $Cu(NO_3)_2$. The catalysts thus prepared have a higher mechanical stability than the catalysts prepared only from CuO or only from $Cu(NO_3)_2$. It is also preferable to use, if required, corresponding mixtures of oxides and nitrates of Zn and/or Mg. Instead of oxides and nitrates, it is also possible to use pure oxides if acidic molding assistants, such as formic acid or oxalic acid, are also added. Particularly when the novel catalysts are prepared in one step, in which all starting materials are mixed and are further processed to give moldings, it is very advantageous to use mixtures of oxides and nitrates.

Furthermore, it is preferable to use a mixture of $Al_2O_3$ and AlOOH as the aluminum component (for example from Condea). Suitable aluminum components are described in EP-A-0 652 805. If, for example, AlOOH and $Al_2O_3$ from Condea are used in the ratio of 70% by weight to 30% by weight, catalysts which have a bimodal pore structure are obtained. They are substantially more active than catalysts having a monomodal pore structure.

To increase the activity at relatively low temperatures, in particular at below 400° C., metals of the 8th subgroup of the Periodic Table of the Elements, such as Pd, Pt, Ru and Rh, can be applied to the catalysts. Preferably, these noble metals are applied by means of an impregnation step, in the form of their nitrates. The impregnation is followed by decomposition at from 200 to 600° C. and reduction to the elemental noble metal. Other, known processes may also be used for applying the noble metals.

The novel catalysts are suitable for the decomposition of $N_2O$. The present invention therefore furthermore relates to a process for the catalytic decomposition of pure $N_2O$ or $N_2O$ contained in gas mixtures, at elevated temperatures, in which a catalyst according to the present invention is used.

Preferably, the novel catalysts are used for the decomposition of $N_2O$ in $N_2O$-containing off-gas streams, as obtained, for example, in processes for the preparation of adipic acid, nitric acid, hydroxyl amine derivatives, caprolactam, glyoxal, methylglyoxal, or glyoxylic acid or in processes for the combustion of nitrogen-containing materials, e.g. $NH_3$.

The process for the decomposition of $N_2O$ in off-gases from the preparation of adipic acid and from the preparation of nitric acid is particularly suitable. The novel process for purifying process gases from ammonia combustion is furthermore suitable.

The $N_2O$ can be eliminated from the nitric acid off-gases without decomposing further oxides of nitrogen, $NO_x$, (desired products) in significant amounts. Further oxides of nitrogen are nitric oxide (NO), dinitrogen trioxide ($N_2O_3$), nitrogen dioxide ($NO_2$), dinitrogen tetroxide ($N_2O_4$), dinitrogen pentoxide ($N_2O_5$) and nitrogen peroxide ($NO_3$). The content of oxides of nitrogen, $NO_x$, may as a rule be from 0 to 50, preferably from 1 to 40, particularly preferably from 10 to 30, % by volume, based on the total gas.

The process is suitable for purifying off-gases whose $N_2O$ content is from 0.01 to 50, preferably from 0.01 to 30, particularly preferably from 0.01 to 15, % by volume, based on the total gas.

In addition to $N_2O$ and further oxides of nitrogen, $NO_x$, the off-gases may also contain, for example, $N_2$, O, CO, $CO_2$, $H_2O$ and/or noble gases, without this substantially affecting the activity of the catalysts. Slight inhibitions of the catalyst activity can be compensated by increasing the catalyst volume or by reducing the loading.

Owing to the high thermal stability of the novel catalysts, the novel process can be carried out at up to 1100° C. In general, the process can be carried out at from 200 to 1100° C., preferably from 450 to 1000° C., particularly preferably from 500 to 900° C. The high thermal stability of the novel catalysts permits load change without problems. The thermal deactivation of the novel catalysts at high temperatures is substantially smaller than that of the catalysts known from the prior art, as shown by the following examples. The La- and Zr-doped catalysts are particularly stable to aging. If the novel process is carried out at relatively low temperatures (from 200 to 500° C.), doping the novel catalysts with noble metals is advantageous.

The examples which follow illustrate the invention.

EXAMPLES

Preparation of the Catalysts

Comparative Example 1 (WO 94/16798)

Cu/Zn/Al Spinel

A mixture of 2840 g of "Puralox SCF" (manufacturer: Condea, Hamburg), 1660 g "Pural SB" (manufacturer: Condea, Hamburg) and 1000 g of CuO (manufacturer: Merck, Darmstadt) was kneaded with 200 ml of formic acid (dissolved in 1400 ml of $H_2O$) for 0.75 h, extruded to give 3 mm extrudates, dried, and calcined for 4 hours at 800° C. 714 g of $CuAl_2O_4$-containing aluminum oxide carrier (water absorption: 69.1%) were impregnated twice with 490 ml of an aqueous solution which contains nitric acid (pH3) and 326 g of $Zn(NO_3)_2$ and then left for 1 hour at room temperature. The impregnated carrier was dried at 120° C. to constant weight and finally calcined for 4 hours at 750° C.

Comparative Example 2 (WO 94/16798)

Cu/Mg/Al Spinel

A mixture of 3460 g of "Puralox SCF", 1800 g "Pural SB" and 1200 g of CuO was kneaded with 180 ml of formic acid (dissolved in 3900 ml of $H_2O$) for 1 h, extruded to give 3 mm extrudates, and dried, and calcined for 4 hours at 800° C. 852 g of the $CuAl_2O_4$-containing aluminum oxide carrier (water absorption: 70%) were impregnated three times with 470 ml of an aqueous solution which contained nitric acid (pH 2.5) and 452 g of $Mg(NO_3)_2 6H_2O$ and then left for 1 hour at room temperature. The impregnated carrier was dried at 120° C. to constant weight and finally calcined for 4 hours at 750° C.

Comparative Example 3

Cu/Al Spinel

A mixture of 1978.3 g of "Puralox SCF", 1082.3 g of "Pural SB", 1942 g of $Cu(NO_3)_2.3H_2O$, and 660.47 g of CuO was treated with 1.5% of formic acid in 400 g of water for 30 minutes in an edgemill, extruded to give 3 mm solid extrudates, and dried at 120° C. and calcined at 750° C.

Example 1

One-stage Preparation

Cu/Zn/Mg/Al Spinel

A mixture of 2169.3 g of "Puralox SCF", 1185.9 g of "Pural SB", 1090.1 g of $Cu(NO_3)_2.6H_2O$, 370.74 g of CuO, 1495.6 g of $Zn(NO_3)_2.4H_2O$, 492 g of ZnO and 2129.6 g of $Mg(NO_3)_2.6H_2O$ was treated for 30 minutes in an edgemill with the addition of 750 g of water, extruded to give 3 mm extrudates, dried, and calcined for 4 hours at 750° C.

Example 2

Two-stage Preparation

Cu/Mg/Al Spinel

A mixture of 1978.3 g of "Puralox SCF", 1082.3 g of "Pural SB", 1942 g of $Cu(NO_3)_2.3H_2O$, and 660.47 g of CuO was treated with 1.5% of formic acid in 400 g of water for 30 minutes in an edgemill, extruded to give 3 mm solid extrudates, and dried at 120° C. and calcined at 800° C. 4060 g of this carrier were impregnated with 1560 g of $Mg(NO_3)_2$ in three impregnation steps. After each impregnation, the extrudates were dried at 120° C. and then calcined for 4 hours at 750° C.

Example 3

Two-stage Preparation: Cu/Zn/Al Spinel

As in Example 2, except with impregnation of 4000 g of the resulting carrier with 2000 g of $Zn(NO_3)_2$ in 2 impregnation steps (zinc nitrate as 18% strength solution in water).

Example 4

Two-stage preparation: Cu/Zn/Mg/Al Spinel

As in Example 2, but with impregnation of 4000 g of the resulting carrier first with 1000 g of $Zn(NO_3)_2$ in two impregnation steps (zinc nitrate as 18% strength solution in water) and then with 750 g of $Mg(NO_3)_2$ in two impregnation steps (magnesium nitrate at 8.3% strength solution in water).

Example 5

Two-stage Preparation: Comparative Catalyst 1+ magnesium nitrate: Cu/Zn/Mg/Al Spinel 715 g of the comparative catalyst 1 were impregnated with 340 g of $Mg(NO_3)_2$, dried, and then calcined for 4 hours at 750° C.

Example 6

Two-stage Preparation: Comparative Catalyst 1+ zinc nitrate: Cu/Zn/Al Spinel 715 g of the comparative catalyst 1 were impregnated with 750 g of $Zn(NO_3)_2$, dried, and calcined for 4 hours at 750° C.

Example 7

La-doped Cu/Zn/Mg/Al Spinel

A catalyst was prepared as in Example 5, except that Pural doped with 3% of La and Puralox doped with 3% of La were used instead of pure Pural (AlOOH) and Puralox ($Al_2O_3$).

Example 8

Ph/Pd-doped Cu/Zn/Mg/Al Spinel

The catalyst was prepared by impregnating catalyst 5 with a solution of $RhCl_3$ and $Pd(NO_3)_2$. The catalyst was dried at 120° C. and heated for 3 hours at 250° C. The catalyst 8 contained 0.3% of $Rh_2O_3$ and 0.18% of PdO.

Example 9

Rh/Pt-doped Cu/Zn/Mg/Al Spinel

The catalyst was prepared by impregnating catalyst 5 with a solution of $RhCl_3$ and $Pt(NO_3)_2$. The catalyst was dried at 120° C. and heated for 3 hours at 250° C. Catalyst 9 contained 0.3% of $Rh_2O_3$ and 0.18% of $PtO_2$.

Carrying Out the Test for $N_2O$ Decomposition

To test the aging behavior, the catalysts were heated at 750° C. for 21 days in a calcination furnace before the tests in order to age them artificially. They were then installed in the test apparatus and tested. The conversion in comparison with the unheated catalysts is a measure of the thermal deactivation.

The tests are carried out under quasi-isothermal conditions in a salt bath reactor. The heating medium used was a salt melt comprising 53% by weight of $KNO_3$, 40% by weight of $NaNO_2$ and 7% by weight of $NaNO_3$. The decomposition was carried out in a 600 mm long reaction tube of Hasteloy C. The internal diameter was 14 mm. The gas was brought to a reaction temperature of 500° C. over a relatively long heating section. To be able to measure the temperature variation in the tube, an inner tube of 3.17 mm external diameter was used, in which a thermo couple can easily be moved. In each case 40 ml of catalyst chips of sievefraction 1.6–2.0 mm were tested at a pressure of 5 bar absolute. The $N_2O$ decomposition was tested using the following gas mixture:

6% $N_2O$, 1.5% of $H_2O$, 1000 ppm NO; 10% of $O_2$, 1% of $CO_2$, remainder $N_2$; GHVS (gas hourly space velocity)=4000 l s.t.p.) of gas per l of catalyst per h

| Results of the tests | | | | | | |
|---|---|---|---|---|---|---|
| Catalyst | C1 | C2 | C3 | E1 | E2 | E3 |
| x value ($M_xAl_2O_4$) | 0.61 | 0.76 | 0.60 | 1.00 | 1.00 | 1.01 |
| Conversion (%) of the undeactivated catalyst | 46.3 | 43.3 | 37.8 | 58.0 | 60.6 | 63.3 |
| Conversion (%) of the catalyst heated for 21 days at 750° C. | 30.1 | 32.1 | 25.2 | 56.2 | 48.5 | 50.3 |
| Catalyst | B4 | B5 | B6 | B7 | B8 | B9 |
| x value ($M_xAl_2O_4$) | 1.05 | 1.01 | 1.00 | 1.00 | 1.00 | 1.00 |
| Conversion (%) of the undeactivated catalyst | 69.6 | 72.3 | 67.1 | 68.7 | 82.5 | 84.8 |
| Conversion (%) of the catalyst heated for 21 days at 750° C. | 48.5 | 65.5 | 52.3 | 68.1 | 65.7 | 64.3 |

We claim:
1. A process for the catalytic decomposition of pure $N_2O$ or $N_2O$ contained in a gas mixture, which comprises bringing the $N_2O$ or the gas mixture containing $N_2O$ into contact with a catalyst at a temperature of 500 to 900° C., and wherein the catalyst is a copper-containing catalyst contain- ing a compound of formula $M_xAl_2O_4$, wherein M is a mixture of Cu with at least one element selected from the group consisting of Zn and Mg, and x is from 0.95 to 1.1, wherein the catalyst is prepared by a process comprising the following steps:

a. preparing a Cu/Al oxide molding, b. impregnating the molding with soluble Cu compounds and at least one compound selected from the group consisting of Mg compounds and Zn compounds, and c. subsequently drying and calcining the impregnated moldings, and wherein, in the process for the preparation of the catalyst, each of Cu, Zn and Mg is used in form of a mixture of oxides and nitrates.

2. The process of claim 1, wherein the catalyst additionally contains at least one oxide selected from the group consisting of Zr and La oxides.

3. The process of claim 1, wherein the catalyst additionally contains metals of the 8th subgroup of the Periodic Table of the Elements.

4. A process for the catalytic decomposition of pure $N_2O$ or $N_2O$ contained in a gas mixture, which comprises bringing the $N_2O$ or the gas mixture containing $N_2O$ into contact with a catalyst at a temperature of 500 to 900° C., and wherein the catalyst is a copper-containing catalyst containing a compound of formula $M_xAl_2O_4$, wherein M is a mixture of Cu, Zn and Mg, and x is from 0.95 to 1.1, wherein the catalyst is prepared by a process comprising the following steps:

a. preparing a Cu/Al oxide molding, b. impregnating the molding with soluble Cu compounds, Mg compounds and Zn compounds, and c. subsequently drying and calcining the impregnated moldings, and wherein, in the process for the preparation of the catalyst, each of Cu, Zn and Mg is used in form of a mixture of oxides and nitrates.

5. The process of claim 4, wherein the catalyst additionally contains at least one oxide selected from the group consisting of Zr and La oxides.

6. The process of claim 4, wherein the catalyst additionally contains metals of the 8th subgroup of the Periodic Table of the Elements.

\* \* \* \* \*